United States Patent [19]
Taylor

[11] 3,972,970
[45] Aug. 3, 1976

[54] METHOD FOR EXTRUDING CELLULAR THERMOPLASTIC PRODUCTS

[75] Inventor: John James Taylor, Northampton Township, Bucks County, Pa.

[73] Assignee: Western Electric Company, Inc., New York, N.Y.

[22] Filed: Feb. 7, 1974

[21] Appl. No.: 440,412

[52] U.S. Cl. .............................. 264/45.9; 264/46.9; 264/50; 264/53; 264/54; 264/174; 264/DIG. 5; 425/113; 425/817 C
[51] Int. Cl.² .................... B29D 27/00; B29F 3/10
[58] Field of Search ............ 264/54, 50, 47, 45, 264/45.5, 46.1, 45.9, 174, 53, DIG. 5; 425/113, 817 C

[56] References Cited
UNITED STATES PATENTS

| | | | |
|---|---|---|---|
| 2,000,835 | 5/1935 | Goldberger | 264/50 X |
| 2,640,033 | 5/1953 | Marshall | 264/50 X |
| 2,848,739 | 8/1958 | Henning | 264/47 X |
| 3,251,911 | 5/1966 | Hansen | 264/50 X |
| 3,316,335 | 4/1967 | Snella et al. | 264/50 |
| 3,466,705 | 9/1969 | Richie | 264/50 X |
| 3,773,877 | 11/1973 | Baker et al. | 264/45.5 X |
| 3,782,870 | 1/1974 | Schippers | 264/46.1 X |
| 3,792,839 | 2/1974 | Gidge | 259/193 |
| 3,796,779 | 3/1974 | Greenberg | 264/50 |
| 3,857,914 | 12/1974 | Aishima et al. | 264/46.1 X |

FOREIGN PATENTS OR APPLICATIONS

| | | | |
|---|---|---|---|
| 521,109 | 9/1952 | Italy | 264/50 |
| 1,168,933 | 10/1969 | United Kingdom | |

*Primary Examiner*—Philip Anderson
*Attorney, Agent, or Firm*—A. S. Rosen; D. P. Kelley

[57] ABSTRACT

A product comprising a cellular plastic material is extruded from a modified conventional extrusion head by injecting a gaseous expanding medium into advancing fluent plastic material through porous material forming at least a portion of a section of the core tube in an extrusion chamber. By controlling the interrelationship between various process parameters such as the speed and pressure of the advancing fluent plastic material, the rate of injection of expanding medium into the advancing plastic material, the place where the expanding medium is injected, and the amount the extruded product is allowed to expand before cooling, it is possible to extrude, from a single source of fluent plastic material, a product comprising many different configurations of cellular and solid plastic material such as a uniform cellular structure throughout, or a cellular plastic inner section with a more dense outer covering.

6 Claims, 7 Drawing Figures

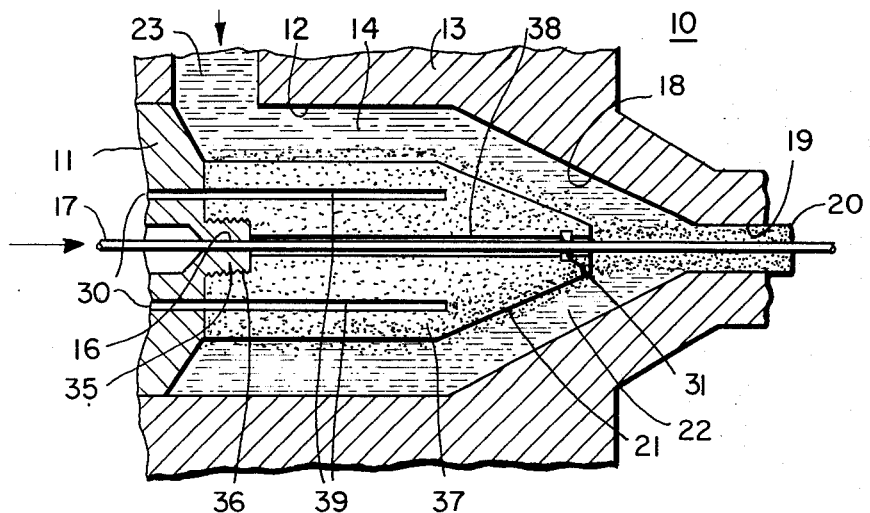
FIG. 3
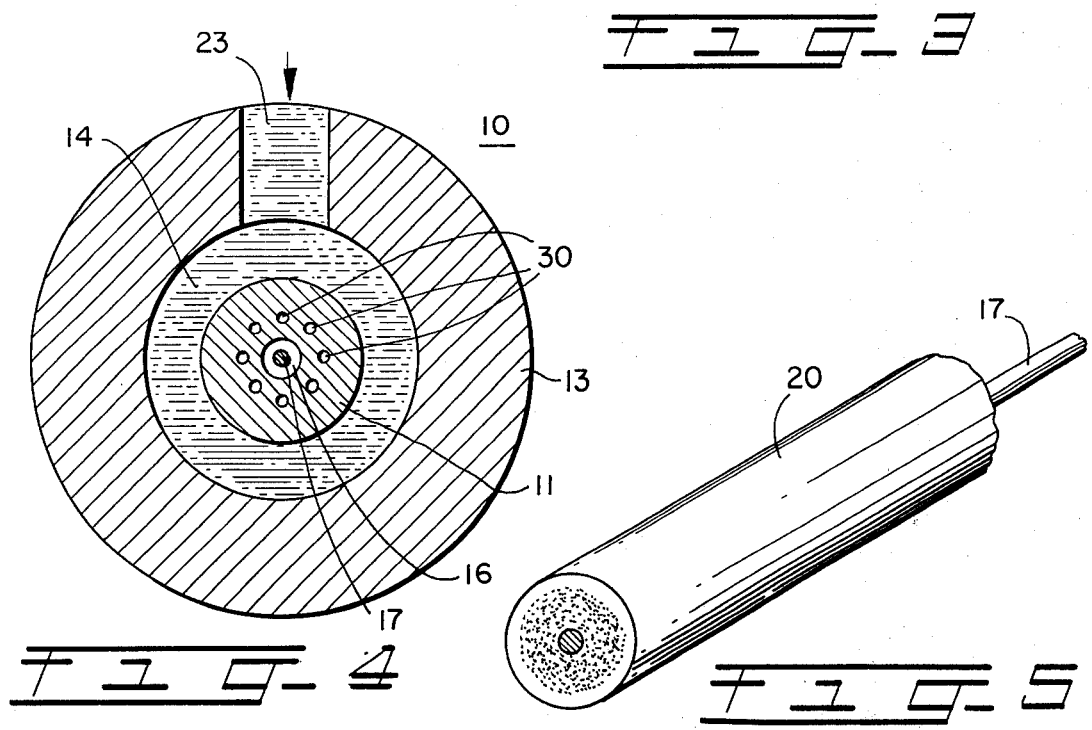
FIG. 4
FIG. 5
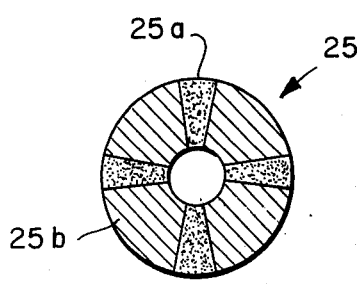
FIG. 6
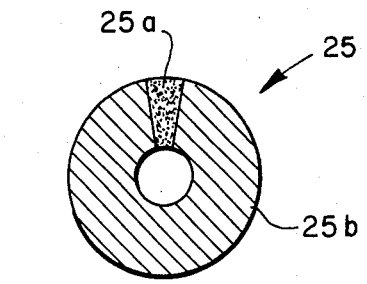
FIG. 7

METHOD FOR EXTRUDING CELLULAR THERMOPLASTIC PRODUCTS

BACKGROUND OF THE INVENTION

1. Field of the Invention

The present invention relates to methods and apparatus for extruding cellular products, and especially for extruding on an advancing filamentary core, as, for example, an electrical conductor wire, a covering of plastic insulation which can be selectively extruded in various configurations such as, for example, a solid plastic covering, a foamed plastic covering or a combined foamed plastic inner section and a more dense plastic outer section covering.

2. Description of the Prior Art

In the manufacture of plastic insulated wires, it is often desirable to provide wire having either a foamed plastic insulating sheathing or a uniform dual plastic insulating sheathing coaxial with the wire. For example, in dual insulated wire the sheathing can comprise an inner layer of foamed plastic for providing the primary insulating covering, and a solid plastic outer layer for providing both additional insulation and a protective covering against abrasion and moisture for both the inner layer and the wire core.

Extruders for forming insulated plastic coverings upon filamentary cores, as, for example, an electrical wire, which term will be used hereinafter and in the annexed claims to include any form of filamentary core, are well known and have been described in U.S. Pat. Nos. 2,766,481 and 2,911,676, issued to G. E. Henning, and U.S. Pat. Nos. 2,928,130 and 3,078,514, issued to A. N. Gray. Such extruders generally include an extrusion cylinder and an extrusion head, the extrusion cylinder having a stock screw rotatably mounted within the bore of the cylinder for forcing a plastic compound from an entrance end of the bore to a delivery end thereof while simultaneously working the plastic compound into a viscous fluent state. The extrusion head is mounted at the delivery end of the cylinder and includes both an extrusion chamber for delivering the fluent plastic compound to an extrusion die at the exit end of the chamber, and a core tube which is centrally positioned in the chamber in axial alignment with and spaced from the die for guiding the advancing wire into and through the center of the die during the extrusion process.

One method of extruding uniform coverings of cellular plastics upon wires is disclosed in U.S. Pat. Nos. 2,766,481, issued to G. E. Henning, and 3,068,532, issued to W. T. Higgins. Therein, a prepared granular composition comprising polyethylene resin and a heat-decomposable blowing agent is continuously fed into the entrance end of the bore of an extrusion cylinder. As the composition is worked and moved through the cylinder by the stock screw, the blowing agent decomposes but is prevented by the extruder design from substantially expanding the composition until the composition is passed out of the die as a covering on the wire.

The use of a blowing agent for extruding an expandable plastic gives rise to an inherent problem, that being the plating out, in the forming portion of the die, of the heat-decomposable blowing agent admixed with the plastic, which requires the extrusion pressure to be increased to achieve a constant flow rate. Furthermore, the residue formed in the die eventually leads to eccentricity of the sheath and out-of-roundness of the product.

A second method and apparatus for extruding a single uniform covering of cellular plastic on a wire comprises forcing a gas, under pressure, into the plastic mass in the extrusion cylinder at a point sufficiently removed from the discharge end of the cylinder. The gas is so introduced as to make it reasonably certain that the gas will be thoroughly and uniformly mixed with the plastic mass by the time the mixture passes the discharge end of the stock screw. Extruders using such arrangement have been described in U.S. Pat. Nos. 2,848,739, issued to G. E. Henning; 2,928,130, issued to A. N. Gray; and 3,251,911, issued to R. A. Hansen. In the Henning patent, the gas is introduced through a porous material and into a portion of the plastic mass diverted by a counter-rotating screw, centrally located within the main stock screw, before the plastic mass is recirculated. Although the second method avoids the use of a heat-decomposable blowing agent and the resulting plating-out problem, an inherent problem with the second method is that the extruded foamed insulation does not always have a uniform bubble distribution throughout. This non-uniformity occurs from the surging found in screw devices which produces a slight pumping effect in the delivery of the plastic composition to the die area.

U.S. Pat. No. 3,466,705, issued to C. A. Richie discloses apparatus for forming foamable plastic materials in a tubular shape for use as packing material to protect fragile devices by combining the first and second methods described above when taken in their broadest sense. Here, a standard extrusion cylinder and stock screw delivers a mixed foamable plastic material to an extrusion die which includes a body member having a central bore, an outwardly curved expansion guide member axially aligned with the body member, and a hollow cylindrical mandrel spaced from and coaxially mounted within the bore of the body member to extend beyond both the body member and the guide member. The foamable material is extruded around the mandrel and allowed to expand within the die and guide member to form a cellular plastic pipe. When a lower density cellular plastic is desired, a foam-augmenting fluid is forced radially outwardly from the mandrel and/or radially inwardly from the guide member into the already expanding plastic material to further expand the extrusion product. The Richie apparatus, however, would not appear suitable for adaptation to the manufacturing of communication wire or cable, since the plating-out and surging problems are still inherent therein. Additionally the introduction of a foam-augmenting fluid basically reduces the ability to control the process and obtain uniform bubble size and distribution throughout the extruded material. Furthermore, in a conventional foamed wire insulation extruder described above, the foam-augmenting fluid would have to be applied after the covering has been extruded and is expanding to achieve a comparable process.

When it is desired to extrude two concentric insulating sheaths of plastic material around a wire, several problems have arisen, especially when the inner sheath is an expanded or foam-type plastic, as for example, expanded polyethylene or polypropylene.

One method of extruding a dual insulation covering on a wire is disclosed, for example, in U.S. Pat. No. 3,404,432, issued to F. T. White et al. There a tandem arrangement of extruders is utilized, one extruder for each sheath to be applied to the wire. While this is the simplest method of applying dual insulation, it is difficult to control the eccentricity of successively applied coverings, thus giving rise to nonuniform capacitance variations coaxially in the cross-sectional plane of the sheathed wire. Additionally, where one of the sheaths is an extruded expandable plastic wherein a heat-decomposable blowing agent was used, the plating-out problem discussed above is also inherent to the system.

An improved prior art method of extruding dual concentric plastic sheaths onto an axially advancing conductor wire is disclosed in U.S. Pat. Nos. 3,538,547, issued to M. J. Drabb, and 3,737,490, issued to P. Nicholson. Here, a single extrusion chamber is utilized in which first and second spaced and coaxially aligned dies pass the wire sequentially. Plastic material for the inner sheath is delivered from a first extrusion bore to the first die where the plastic material is applied to and formed around the wire. The insulated wire is thereafter passed through the second die, to which the second plastic material is delivered from a second extrusion bore to impinge upon and be formed around the insulated wire.

The two-die method permits higher line speeds than the tandem method, but requires a critical coaxial alignment of the dies to prevent eccentricities in the insulating sheaths. The most serious defect found in any two-die method is that the pressures in the dies are cumulative, making it difficult to control the blowing of the expanded plastic.

In another prior art method, as disclosed in U.S. Pat. Nos. 3,229,012 and 3,446,883, issued to O. G. Garner, the plastic material for the outer sheath of a dual insulated wire is bled around the entrance portion of the forming die in the extrusion passageway before the insulating material for the first sheath is compressed around the advancing wire such that the second plastic forms a barrier between the forming die and the first sheath.

This method would appear to prevent plating out of the blowing agent where the inner sheath is an expanded plastic and the outer sheath is a solid plastic, but, since the plastic materials for both sheaths communicate with one another directly before the flow of at least the plastic for the inner sheath is permitted to develop, irregularities and nonuniform skin thickness can result.

There exists, therefore, a need for a method and apparatus for extruding a concentric, dual-section, plastic covering onto an elongated wire moving at high line speeds wherein plating out of a blowing agent for expanded plastics is eliminated, or minimized; better control of expansion is obtained; and the inner and outer sections of the covering are concentric and of uniform thickness. Furthermore, since prior art methods and apparatus for extruding dual coverings require a separate extrusion cylinder for each sheath, there also exists a need for a simple and inexpensive method and apparatus which can selectively extrude different configurations of sheathing such as a solid plastic sheath; an expanded plastic sheath; or a concentric, dual-section covering, where the inner section is of an expanded plastic material, from a single source of supply.

SUMMARY OF THE INVENTION

One object of the present invention is to provide new and improved methods and apparatus for extruding cellular products and especially a concentric expanded plastic sheath coaxially onto an advancing wire.

Another object of the present invention is to provide new and improved methods and apparatus for simultaneously extruding a concentric, two-sectional, plastic product or covering around an advancing wire, wherein one radial or concentric section comprises an expanded plastic.

Another object of the present invention is to provide new and improved methods and apparatus for extruding a plastic product with two concentric sections of plastic material which may be a covering extruded onto an advancing wire, wherein one section is an expandable plastic and the plastic material for forming both sections is capable of being supplied from a single source.

Still another object of the present invention is to provide new and improved core tube arrangements which, in cooperation with the forming die, will be capable of extruding either a concentric plastic sheath, or a covering with two coaxial concentric plastic sections onto an advancing wire, wherein one of the two sections is an expanded plastic and the plastic for forming the sections may be supplied from a single source.

A method of extruding a cellular plastic covering upon a wire which is sequentially advancing through both a core tube, coaxially located in an extrusion chamber, and an extrusion die, in accordance with the present invention, may include forcing a stream of viscous fluent plastic insulation material into the extrusion chamber and around both the core tube and the advancing wire, while simultaneously diffusing a gaseous expanding medium into the fluent plastic material at a plurality of equiangularly spaced points about the core tube. In a preferred embodiment, the gaseous expanding medium is diffused into the plastic material where the distance between the surfaces of the die and core tube approach a minimum. By individually controlling the interrelationship of process parameters such as the speed and pressure of the advancing fluent material, the rate of injection of expanding medium into the advancing plastic material, the place where the expanding medium is injected, the wire temperature when a wire is used to form the product, and the amount the extruded covering is allowed to expand before cooling takes place, it is possible to extrude, from a single source of fluent plastic material, a product comprising various configurations such as a cellular plastic sheath, a dual concentric plastic sheath wherein a solid plastic layer is formed over a cellular plastic layer, or a solid plastic layer with or without a radially arcuate section of cellular plastic insulation can be extruded about the wire.

An apparatus for extruding a cellular plastic covering upon a wire being guided by a core tube while advancing through an extrusion chamber into which a stream of fluent plastic material is forced and having an extrusion die therein through which the wire is passed axially, in accordance with the present invention, may include means for diffusing a gaseous expanding medium into the fluent plastic material, for example, through a porous material, at a plurality of equiangularly spaced points about the core tube and, in the preferred embodiment, located where the distance between the surfaces of the die and core tube approach a minimum.

BRIEF DESCRIPTION OF THE DRAWINGS

A more complete understanding of the present invention will be obtained from the following detailed description of a preferred embodiment thereof when read in conjunction with the accompanying drawings and the appended claims. In the drawings, in which like reference characters indicate corresponding parts in all views:

FIG. 3 is a section in elevation of another alternative arrangement of the core tube usable in the extruder head according to the present invention;

FIG. 4 is a cross-sectional view of the core tube and die body in the area of the inlet to the extrusion chamber;

FIG. 5 is an isometric view of a dual-insulation covering on a wire formed according to the present invention, wherein the covering includes a cellular plastic inner section and a solid plastic outer section;

FIG. 6 is a cross-sectional view of an alternative arrangement of the washer forming a portion of the core tube in FIG. 1; and FIG. 7 is a cross-sectional view of another alternative arrangement of the washer forming a portion of the core tube in FIG. 1.

DETAILED DESCRIPTION

The description which follows is mainly directed towards the extrusion of a covering comprising cellular material on a wire. It should be understood that the present methods and apparatus are also applicable for extruding any product comprising a cellular material including those products without a wire.

Figure 1:
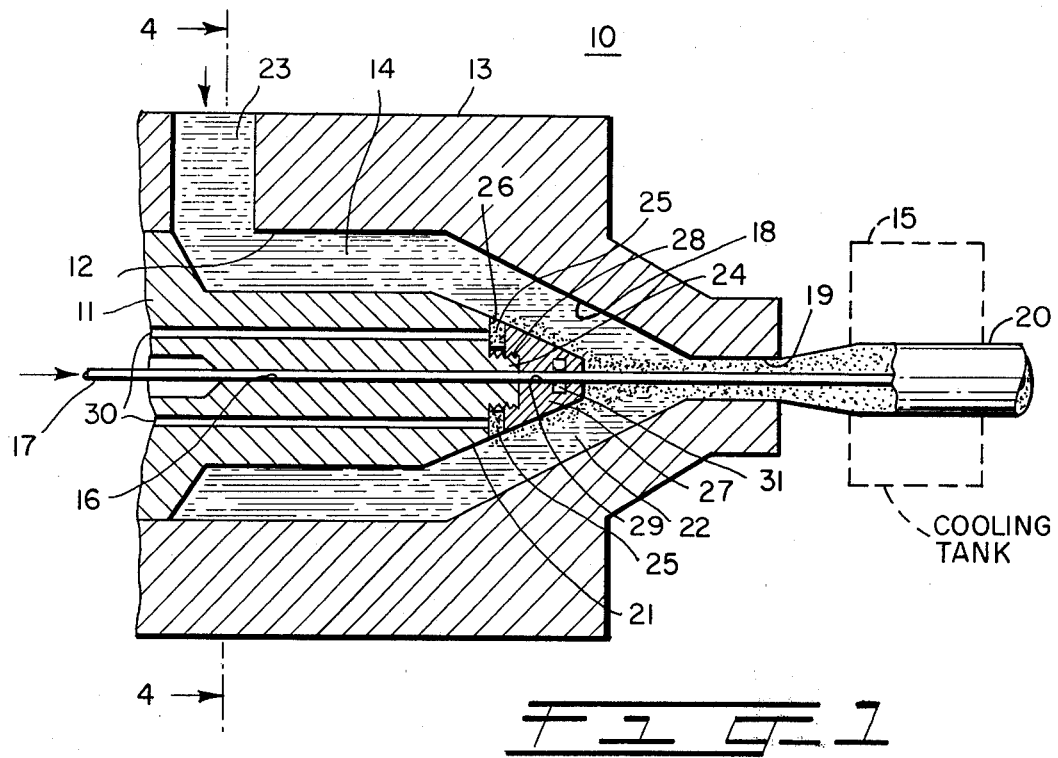
FIG. 1 is a section in elevation through a wire insulation covering extruder head according to the present invention, wherein the insulation covering extruded onto the wire can be of a cellular plastic.

Referring to FIG. 1, an extrusion head 10, according to the present invention and forming part of an extrusion machine (not shown), includes a core tube 11 coaxially supported in a bore 12 of a conventional extrusion die body 13 to form a conventional extrusion chamber 14 therebetween. Core tube 11 is provided with a central longitudinal aperture 16 through which a bare wire 17 can be advanced from left to right, as shown in FIG. 1. At the exit end of extrusion chamber 14, die body 13 includes a funnel-shaped, wall-forming surface 18 leading to a throat 19 which determines the overall diameter of the extruded covering 20 on wire 17 being advanced coaxially through throat 19. Core tube 11 also includes a forward-tapered end 21 that is spaced from and positioned adjacent funnel-shaped surface 18 of die body 13 to form a passageway 22 in extrusion chamber 14 wherein the distance between tapered end 21 and surface 18 approaches a minimum as passageway 22 approaches throat 19.

A fluent plastic insulating material, such as, for example, molten polyethylene, for forming covering 20 on wire 17, enters extrusion chamber 14 through opening 23 in die body 13. The plastic insulating material is conveniently forced into extrusion chamber 14 through opening 23 by a conventional extrusion cylinder and screw feeding means (not shown). Passage of the plastic insulating material through passageway 22 and throat 19 of die body 13 forces the plastic material to flow and form a compact covering around wire 17 as the wire advances coaxially through throat 19.

In the preferred embodiment of the present invention, as shown in FIG. 1, a conventional core tube 11 is modified to partially truncate the forward-tapered end 21 of the core tube and provide a threaded, centrally located, longitudinal extension 24 thereon. A circular tapered-edged washer 25 is positioned over threaded extension 24 and placed into contact with truncated end surface 26 of core tube 11. Washer 25 is formed of a suitable porous material such as, for example, a porous stainless steel, sintered porcelain or similar material which is sufficiently porous to permit the diffusion of a gaseous expanding medium such as, for example, carbon dioxide, therethrough and into passageway 22 at a relatively high rate, but which will not permit the passage of the fluent plastic material in passageway 22 therethrough.

A metallic core-tube nose piece 27, having a frusto-conical shape, includes a threaded bore 28 for affixing nose piece 27 against washer 25 when screwed into position on extension 24, and a central longitudinal aperture 29. Aperture 29 is positioned to align with aperture 16 in core tube 11 once nose piece 27 is affixed on extension 24 in order that wire 17 can be guided therethrough and coaxially into throat 19. An industrial diamond 31 is position near the exit end of aperture 29, as is well known in the art, for guiding wire 17 through apertures 16 and 29 with minimal contact with the walls thereof.

Core tube 11 is also provided with a plurality of longitudinal passageways 30, preferably equally spaced about longitudinal aperture 16, as shown in FIG. 4, which communicate at one end with washer 25 and at the other end with a high pressure source of suitable gaseous expanding medium (not shown). A pressure regulating means (not shown) for selectively varying the pressure of the gaseous expanding medium being introduced into passageways 30 would be provided with the high-pressure source.

In the operation of the extrusion apparatus described hereinabove, the fluent plastic insulation material is delivered under pressure from a screw feeding means (not shown) into extrusion chamber 14 though opening 23 and advanced through both passageway 22 and throat 19. Simultaneously therewith, wire 17 is advanced through apertures 16 and 29 in core tube 11 and nose piece 27, respectively, and coaxially through throat 19.

While the fluent insulation material is being advanced through extrusion chamber 14, and passageway 22 therein, a suitable gaseous expanding medium is introduced into the advancing insulation material through the porous material of washer 25. Manifestly, the pressure of the expanding medium must be sufficient to overcome the pressure of the advancing insulation material in extrusion chamber 14, and passageway 22 in particular. It has been found that a pressure of, for example, from 50–100 psi greater than the insulation material pressure near washer 25 is sufficient to inject bubbles into the fluent insulation material. It is, of course, possible to use pressures outside this range and still obtain an adequate result. Since washer 25 forms the entire peripheral surface of a section of tapered end 21 of core tube 11, the gaseous expanding medium is injected into the advancing insulation material at discrete points all around core tube 11. The insulation material with the gaseous expanding medium envelopes the continuously advancing wire 17 in throat 19, and is extruded on wire 17 as a covering 20 of insulation material comprising a uniform cellular form around wire 17.

As found in other extrusion heads, extrusion chamber 14, including passageway 22 and throat 19, should be designed to maintain the pressure therein sufficiently high to prevent the expanding medium from expanding the insulation material until the material emerges from throat 19 as covering 20. Diffusion of the expanding medium outwards through the fluent insulation material in passageway 22 and throad 19 is restricted, and is dependent on factors such as the line speed of the extrusion apparatus, the thickness of the interface between funnel-shaped surface 18 of die body 13 and both tapered end 21 and nose piece 27 of core tube 11, and the downstream distance between throat 19 and the point where the expanding medium is introduced into he advancing the material. Outward diffusion of the expanding medium can also be controlled by applying a cooling medium, which can be in the form of a tank 15 of cooling fluid, to covering 20 at a predetermined distance from the exit end of throat 20 to limit the time during which expansion is allowed to take place in the extruded covering. Since expansion in the extruded covering will stop once the cooling medium is applied, the amount of outward diffusion can be reduced by applying the cooling medium at a point nearer the exit end of throat 19. The rate of diffusion of the expanding medium into the fluent insulation material may be controlled by varying, inter alia, the porosity of the material used for forming washer 25, which also controls the cell size down to the micron range in extruded covering 20, and the pressure at which the expanding medium is supplied through passageways 30.

In normal operation, the gaseous expanding medium is injected into the advancing insulation material at discrete points all around washer 25 to form a multiplicity of minute discrete bubbles evenly distributed thereabouts. These bubbles advance with the insulation material towards throat 19 in the area adjacent to nose piece 27 and wire 17 and diffuse outwards towards the outside diameter of covering 20 a distance which is dependent on the various process parameters discussed above. Therefore, by controlling the interrelationship between various process parameters such as the line speed, which is controlled by the speed and pressure of the advancing fluent insulation material, the wire temperature, and the pressure at which the gaseous expanding medium is injected into the insulation material, it is possible to control the diffusion of the bubbles outwards and obtain a covering with a substantially uniform cellular structure throughout, or a covering having a solid section over a substantially uniform inner cellular section, in various proportions, as shown typically in FIG. 5. For example, the distance that the bubbles diffuse outwards can be reduced by either increasing the speed or pressure of the advancing fluent insulation material, decreasing the wire temperature, decreasing the differential pressure between the advancing insulation material and the gaseous expanding medium or applying a cooling medium to the extruded covering nearest the exit end of the die throat. It is, of course, also possible to obtain a solid covering on wire 17 by not injecting any gaseous expanding medium into the advancing insulation material in extrusion chamber 14 during the extrusion process.

The use of a porous material for washer 25 prevents clogging of the expanding medium injection means should either the process or the flow of gaseous expanding medium be temporarily stopped. It, therefore, becomes evident that the design of the present extrusion head 10, when used in a conventional single-feed extrusion machine, provides a very versatile machine for forming uniform coverings of varied type and structure on a wire with little or no changeover or maintenance, and with no plating out effect.

Figure 2:
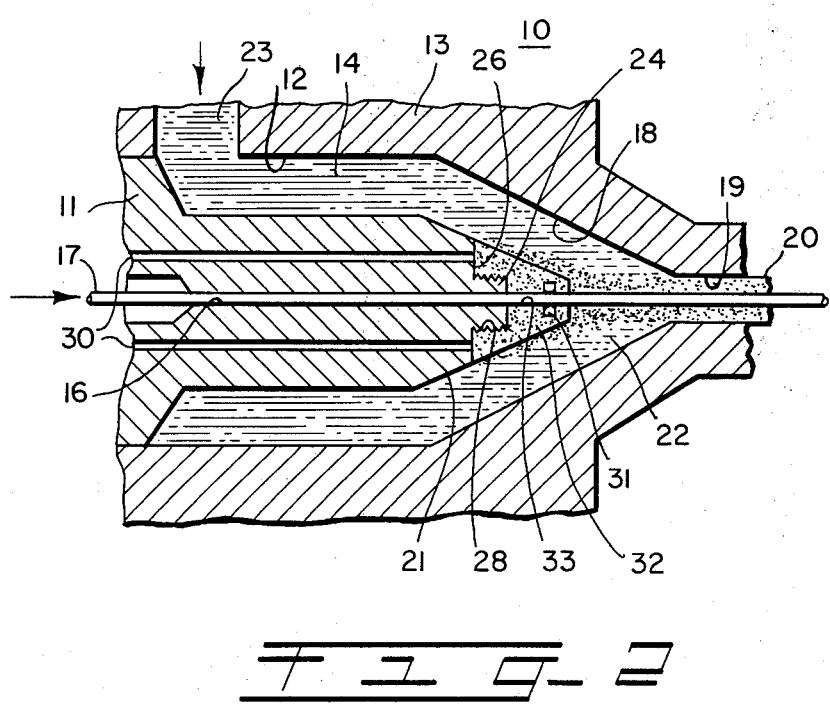
FIG. 2 is a section in elevation through an alternative arrangement of the core tube usable in the extruder head according to the present invention.

There is shown in FIG. 2 an alternate form of the apparatus shown in FIG. 1, wherein extrusion head 10 has essentially the same structure as found in FIG. 1, except in the area of the partially truncated end of core tube 11. In the alternate form, washer 25 and nose piece 27 of FIG. 1 have been replaced by a nose cone 32, formed of a suitable porous material similar to that of washer 25. Nose cone 30 maintains the frusto-conical shape of nose piece 27 of FIG. 1, and includes a longitudinal aperture 33 having a threaded section at the wider end of the nose cone. Extension 24, on core tube 11, includes external threads which match the threaded section 28 of nose cone 32, respectively, to permit mounting of nose cone 32 on extension 24. An industrial diamond 31 is mounted in the longitudinal aperture 33 of nose cone 32 for guiding wire 17 therethrough and coaxially into throat 19 to minimize contact of wire 17 with the walls of apertures 16 and 33.

The operation of the apparatus of FIG. 2 closely resembles that of the apparatus of FIG. 1 since passageways 30 communicate with nose cone 32, except that a greater quantity of gaseous expanding material can be injected into the advancing fluent insulation material for a given pressure differential because of the greater porous material surface area provided by nose cone 32 over washer 25.

In FIGS. 1 and 2 it is shown that the gaseous expanding medium injection means 25 and 32 are located at the tapered end 21 of core tube 11 where the distance between die body 13 and core tube 11 approaches a minimum. By locating the injection means at tapered end 21, it is possible to achieve a fine control of the distance that the gaseous expanding medium diffuses outwards in the fluent plastic material by controlling the gaseous expanding medium injection pressure. It is, however, also within the scope of the present invention, to locate the injection means in any cross-sectional portion of core tube 11 within extrusion chamber 14 and still extrude a uniform cellular covering, although the control of the outward diffusion of the gaseous expanding medium may be somewhat reduced.

Referring to FIG. 3, another alternate form of extrusion head 10 is shown wherein the expanding medium injection means forms a major part of the peripheral surface of core tube 11 in extrusion chamber 14. As shown in FIG. 3, core tube 11 is partially truncated at a point near opening 23 of extrusion chamber 14 and is provided with a centrally located longitudinal extension 35 similar to extension 24 of FIGS. 1 and 2. Extension 35 includes a threaded section 36 formed on the outer periphery for permitting a nose cone 37 of suitable porous material to be mounted thereon.

Nose cone 37 has a cylindrical shape with a forward tapered end 21 and comprises a coaxial bore 38 which extends therethrough, and at least one longitudinal aperture 39 extending partially therethrough between central bore 38 and the periphery of the nose cone 37.

Coaxial bore 38 is threaded to permit the mounting of the nose cone on extension 35. The at least one aperture 39 can comprise any shape which permits the apertures to communicate with one or more of the passageways 30 thereby assuring a substantially uniform distribution of the gaseous expanding medium throughout the porous material of nose cone 37.

In operation, the gaseous expanding medium is injected into the advancing fluent insulation material at discrete points around the entire peripheral surface of nose cone 37 to permit a uniform cellular covering 20 to be extruded around wire 17 similar to that described for the operation of the apparatus shown in FIGS. 1 and 2.

In any of the alternative methods and apparatus described hereinabove, an additional step can be included for increasing the foaming reaction in the extruded, expanding medium injected, insulation material without altering the settings of any of the previously mentioned process parameters. The additional step provides for admixing a very small amount of suitable, commercially available, chemical blowing agent with the insulation material prior to delivery of the insulation material into extrusion chamber 14 through opening 23. This additional step is performed in the area of the screw feeding means (not shown) in accordance with any known method.

The combined use of a small amount of commercially available chemical blowing agent with the present injection of a gaseous expanding medium through core tube 11 greatly minimizes the plating out effect, compared with prior art methods using solely a chemical blowing agent, while still achieving a uniform cellular extruded covering 20.

In FIG. 4 there is shown a cross-sectional view of core tube 11 wherein a plurality of longitudinal passageways 30 are equiangularly spaced about aperture 17. Although eight passageways are shown in FIG. 4 for illustrative purposes, it is to be understood that any number of passageways, from one on up, can be provided comprising any shape, such as a curved slot, which will sufficiently insure a substantially uniform distribution of the gaseous expanding medium throughout the expanding medium injection means of FIGS. 1 to 3.

In the arrangement of FIGS. 1 to 3 it is shown that the porous material of the expanding medium injection means extends entirely around the periphery of a section of core tube 11. Although such arrangement is preferable for producing a uniform cellular extruded covering 20, the present invention will also produce a uniform cellular covering when the porous material is equiangularly spaced about only a portion, which may be a major portion of the peripheral surface of a section of core tube 11. A typical configuration for the latter arrangement is shown in FIG. 6 wherein washer 25 of FIG. 1 can be formed with a plurality of equiangularly spaced porous material sections 25a interspersed between a plurality of non-porous material sections 25b. Nose cones 32 and 37 of FIGS. 2 and 3, respectively, can be similarly formed with equiangularly spaced porous material sections. In order to obtain a uniform cellular structure throughout covering 20 with the latter arrangement, it may be necessary to alter certain process parameters. For example, slowing the line speed, would permit sufficient time for the bubbles to diffuse throughout the advancing insulation material before extrusion.

It is also within the scope of the present invention to extrude products wherein a discrete, radially arcuate portion thereof comprises a cellular structure by injecting the gaseous expanding medium through a suitable porous material located at a similar discrete point on the periphery of core tube 11. A typical configuration for the latter arrangement is shown in FIG. 7 wherein washer 25 of FIG. 1 is shown as having a discrete radial section 25a of a porous material with the remainder of the washer formed of a non-porous material 25b.

While in the foregoing description polyethylene has been mentioned as the plastic insulating material employed to produce the cellular plastic insulating covering of the finished insulated conductor, this invention is not restricted to the use of polyethylene as the plastic insulating material. Instead of polyethylene, plasticized polystyrene, polyvinyl halide compounds, copolymers of polyvinyl chloride and polyvinyl acetate, nylon, or other suitable thermoplastic materials may be used to form various extruded cellular plastic products.

Carbon dioxide has been mentioned as one form of gaseous expanding medium that might be used to produce cellular plastic products. In place of carbon dioxide, other normally gaseous elements, compounds or mixtures thereof may be used as the agent to produce cellular plastic products. Among the other gases that might be employed as the gaseous expanding medium with satisfactory results are argon, neon, helium, and nitrogen.

In addition, normally gaseous organic compounds may be used to expand the plastic material. Among the most important of these are the halogen derivatives of methane and ethane, which are used as refrigerants and for similar purposes, such as chlorodifluoromethane, dichlorodifluoromethane, dichlorofluoromethane, trichlorofluoromethane, difluorotetrachloroethane, dichlorotetrafluoroethane, difluorochloroethane, 1,1-difluoroethane, ethyl chloride, methyl bromide, methyl chloride, and trichlorofluoromethane.

Other normally gaseous compounds that may be employed are acetylene, ammonia, butadiene, butane, butene, carbon dioxide, cyclopropane, dimethylamine, 2,2-dimethylpropane, ethane, ethylamine, ethylene, isobutane, isobutylene, methane, monomethylamine, propane, propylene, and trimethylamine.

All of the aforementioned materials are intended to be embraced within the term "gaseous expanding medium" as used herein and in the annexed claims. This term is intended to means that the expanding medium employed is a gas under normal atmospheric pressures and temperatures. Also, when reference is made in the annexed claims to the introduction of a gaseous expanding medium or a gas into a plastic compound, it is to be understood that the material introduced is a gas under normal conditions although at the pressure at which it is so introduced it may be in the liquid state.

What is claimed is:
1. A method of providing a layer of thermoplastic material, including at least a cellular portion, around a wire, said method comprising:
  a. providing an extrusion head having an inlet opening, a longitudinal axis extending therethrough, and an outlet opening;
  b. providing a core tube extending longitudinally into said extrusion head having a porous surface in at least a discrete portion of the periphery thereof between the inlet and outlet openings of said extrusion head, the core tube including a longitudinally oriented aperture extending therethrough and opening longitudinally into the interior of said extrusion head substantially centrally with respect to said porous surface;
c. forcing fluent thermoplastic material into the inlet opening of said extrusion head, through said extrusion head and along said porous surface, and out of said extrusion head through the outlet opening thereof;
d. introducing through said porous surface a gaseous expanding medium into said fluent thermoplastic material so that the expanding medium is incorporated in at least a discrete central region of the fluent thermoplastic material;
e. advancing a wire through said longitudinally oriented aperture extending through said core tube, then along a path in said extrusion head, and then out through the outlet opening thereof such that the wire passes substantially through the center of said discrete central region of the fluent thermoplastic material;
f. extruding said fluent thermoplastic material and said gaseous expanding medium located in at least said discrete central region therein from the extrusion head through the outlet opening thereof as a layer surrounding said wire; and
g. expanding said gaseous expanding medium in said fluent thermoplastic material as the fluent thermoplastic material and the wire exit together from the outlet opening of said extrusion head.

2. Method as in claim 1, comprising:
h. performing step (d) by introducing said gaseous expanding medium into said fluent thermoplastic material through a porous surface extending only partially around said longitudinal axis.

3. Method as in claim 1, comprising:
h. performing step (d) by introducing said gaseous expanding medium into said fluent thermoplastic material through portions of a porous surface equiangularly spaced around said longitudinal axis.

4. Method as in claim 1, comprising:
h. performing step (d) by introducing said gaseous expanding medium through said fluent thermoplastic material through a porous surface which extends completely around said longitudinal axis.

5. A method of making a product comprising at least one discrete arcuate section of cellular thermoplastic material, the method comprising the steps of:
forcing a fluent thermoplastic material through a pressurized zone of both an extrusion chamber and an extrusion die of an extrusion head;
injecting a gaseous expanding medium into the advancing fluent thermoplastic material in the pressurized zone through porous material forming at least one discrete arcuate portion of the periphery of a core tube mounted within the extrusion chamber so that the expanding medium is incorporated in at least one discrete arcuate central region of the fluent thermoplastic material; and
discharging the fluent thermoplastic material with the expanding medium incorporated therein through the extrusion die to form the product.

6. The method in accordance with claim 5, wherein said product is coated wire, the method comprising the additional step of:
advancing a wire through both a longitudinal aperture in the core tube mounted within said extrusion chamber and the extrusion die.

* * * * *